G. C. LUDGATE.
PROTECTOR.
APPLICATION FILED JAN. 28, 1913.
1,073,861. Patented Sept. 23, 1913.
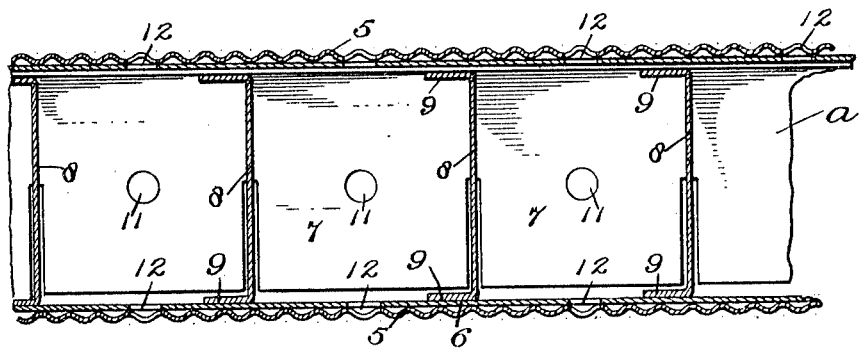
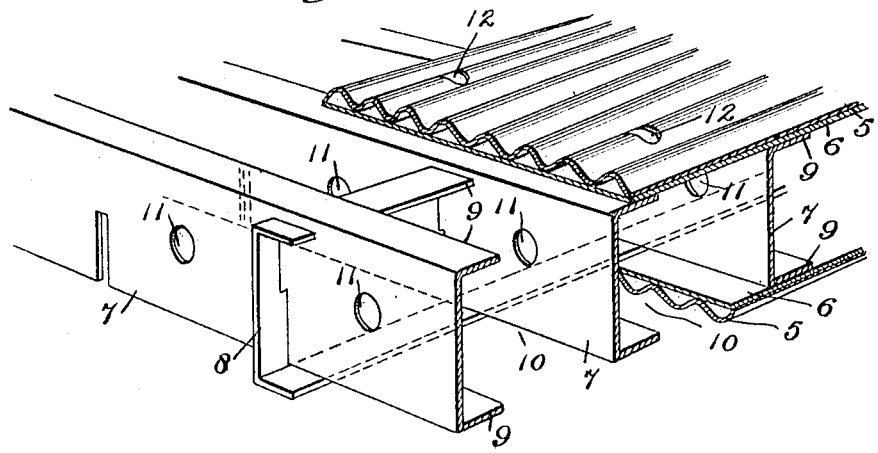
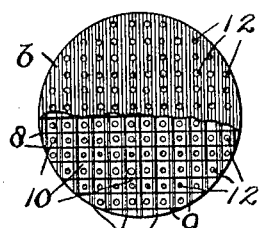
Inventor
George C. Ludgate,
By Victor J. Evans
Attorney
Witnesses

UNITED STATES PATENT OFFICE.

GEORGE C. LUDGATE, OF BROOKLYN, NEW YORK.

PROTECTOR.

1,073,861.   Specification of Letters Patent.   Patented Sept. 23, 1913.

Application filed January 28, 1913. Serial No. 744,698.

*To all whom it may concern:*

Be it known that I, GEORGE C. LUDGATE, a citizen of the United States, residing at Brooklyn, in the county of Kings and State of New York, have invented new and useful Improvements in Protectors, of which the following is a specification.

This invention relates to protectors for fruit, vegetables and the like and it consists in the novel features hereinafter described and claimed.

An object of the invention is to provide a structure of simple arrangement which not only protects the fruit when it is packed in a receptacle but which also permits the same to be subjected to sufficient ventilation or air which may pass freely from one cell to another of the structure in which the fruit or vegetables are packed.

Other objects will appear and be better understood from that embodiment of my invention of which the following is a specification, reference being had to the accompanying drawings forming part hereof, in which:—

Figure 1 is a detail vertical cross section of the device. Fig. 2 is a fragmentary perspective of the device partly in section. Fig. 3 is a plan on a reduced scale of the invention partly in section.

The body $a$ may be formed of any material found suitable for the purpose, as pasteboard. My reason for electing to specify pasteboard is because this material is relatively cheap and here cheapness is a factor more important than durability, since devices of this kind are usually discarded or thrown away by the retailer as they are successively moved from the receptacle. The body $a$ is composed of the following elements. Corrugated plates 5 are provided at one side with flat plates 6. These plates are provided with corresponding or registering openings 12. Strips 7 are slotted at one edge and engage slotted strips 8, these strips when in position extend transversely with relation to each other and the strips 7 and 8 are provided at their edge portions with flanges 9 which are approximately horizontally disposed. The flanges 9 are disposed at right angles to the intermediate portion of the strips 7 and 8. The spaces between the interlocking strips 7 and 8 form cells or compartments 10. The strips are provided in their sides with openings 11 through which air may pass from one cell to the adjacent cell. Air may pass through the openings 12 from one set of cells through an adjacent set of cells, consequently ample ventilation is provided for the fruit which is packed in the cells.

In use a device such as just described, may be placed on the bottom of the receptacle so as to support the first layer of fruit, vegetables or the like. This done, a second layer is superimposed on the first layer so as to form a support for the succeeding layers. This arrangement is continued until the receptacle is full, at which time the contents of the receptacle are positioned to receive fresh air during transit and insured against damage resulting from the objects bearing directly one upon the other.

What is claimed as new is:

A protector comprising a plurality of sets of interlocking elements disposed transversely with relation to each other whereby cells are provided between the said elements, said elements having edge portions disposed approximately at right angles to their intermediate portions and located in said cells and corrugated plates located adjacent the flanges of the sets of elements and having openings which communicate with the cells.

In testimony whereof I affix my signature in presence of two witnesses.

GEORGE C. LUDGATE.

Witnesses:
JOHN A. DONEGAN,
M. E. LAUGHLIN.

---

Copies of this patent may be obtained for five cents each, by addressing the "Commissioner of Patents, Washington, D. C."